(12) United States Patent
Berdichevsky

(10) Patent No.: US 7,494,130 B2
(45) Date of Patent: Feb. 24, 2009

(54) BI-DIRECTIONAL PATTERN FOR DYNAMIC SEALS

(75) Inventor: Alexander Berdichevsky, Farmington Hills, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 182 days.

(21) Appl. No.: 11/352,627

(22) Filed: Feb. 13, 2006

(65) Prior Publication Data
US 2007/0187904 A1   Aug. 16, 2007

(51) Int. Cl.
F16J 15/32 (2006.01)
(52) U.S. Cl. ........................ 277/559; 277/400
(58) Field of Classification Search ......... 277/399–400, 277/559
See application file for complete search history.

(56) References Cited

U.S. PATENT DOCUMENTS

| 3,527,465 | A | * | 9/1970 | Guinard | 277/400 |
|---|---|---|---|---|---|
| 3,638,957 | A | * | 2/1972 | Marsi | 277/400 |
| 3,984,113 | A | | 10/1976 | Bentley | |
| 3,988,078 | A | | 10/1976 | Barker | |
| 4,008,014 | A | | 2/1977 | Staebler | |
| 4,055,106 | A | | 10/1977 | Frey | |
| 4,111,436 | A | | 9/1978 | Yazawa | |
| 4,118,856 | A | * | 10/1978 | Bainard et al. | 29/511 |
| 4,119,324 | A | | 10/1978 | Denton et al. | |
| 4,132,421 | A | | 1/1979 | Corsi et al. | |
| 4,256,208 | A | | 3/1981 | Najer et al. | |
| 4,451,050 | A | | 5/1984 | Repella | |
| 4,487,561 | A | | 12/1984 | Eiermann | |
| 4,501,431 | A | | 2/1985 | Peisker et al. | |
| 4,822,058 | A | * | 4/1989 | Butler et al. | 277/559 |
| 4,845,828 | A | | 7/1989 | Reed | |
| 5,009,583 | A | | 4/1991 | Carlsson et al. | |
| 5,118,267 | A | | 6/1992 | Dollhopf | |
| 5,190,440 | A | | 3/1993 | Maier et al. | |
| 5,664,787 | A | | 9/1997 | Fuse et al. | |
| 5,692,757 | A | | 12/1997 | Straub | |
| 5,755,446 | A | | 5/1998 | Dean et al. | |
| 5,791,658 | A | | 8/1998 | Johnston | |
| 6,170,834 | B1 | | 1/2001 | Vogt | |
| 6,357,325 | B1 | | 3/2002 | Vogt | |
| 6,409,177 | B1 | | 6/2002 | Johnston | |
| 6,428,013 | B1 | | 8/2002 | Johnston et al. | |

FOREIGN PATENT DOCUMENTS

| EP | 0128645 | 12/1984 |
|---|---|---|
| EP | 0 447 766 A2 | 9/1991 |
| EP | 0 286 211 B1 | 8/1993 |

(Continued)

Primary Examiner—Vishal Patel
(74) Attorney, Agent, or Firm—Ronald W. Wangerow; Harness, Dickey & Pierce, P.L.C.

(57) ABSTRACT

A bi-directional dynamic seal advantageously provides for the return of captured lubricant to the lubricant side regardless of a direction of relative rotation between the seal and the shaft. The seal utilizes a pattern of symmetrical pumping elements to facilitate the hydrodynamic pumping of the captured lubricant in response to the relative rotation. The symmetrical pumping elements have ending points that stop short of the seal edge of the seal. The seal may utilize secondary pumping elements that communicate with the primary pumping elements to capture lubricant that is not captured by the primary pumping elements.

28 Claims, 5 Drawing Sheets

FOREIGN PATENT DOCUMENTS

| | | |
|---|---|---|
| EP | 0 657 641 A2 | 6/1995 |
| EP | 0 432 287 B1 | 10/1995 |
| EP | 0 564 153 B1 | 7/1996 |
| EP | 0 771 398 B1 | 10/1998 |
| EP | 1 026 428 A2 | 12/1999 |
| EP | 0 792 426 B1 | 6/2000 |
| EP | 0 684 413 B1 | 2/2002 |
| EP | 0 879 977 B1 | 5/2003 |
| WO | WO 96/02777 | 2/1996 |

* cited by examiner

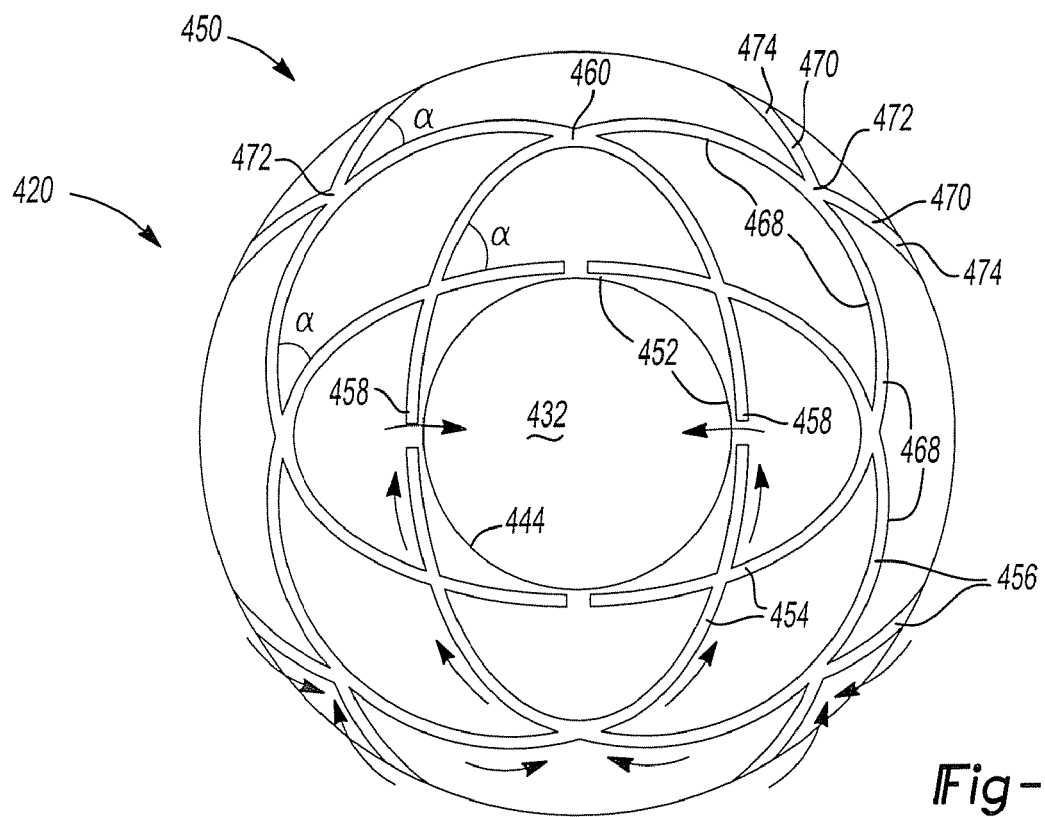
_Fig-7_
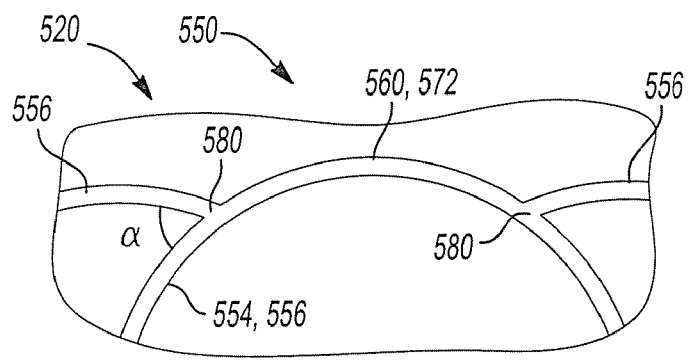
_Fig-8A_
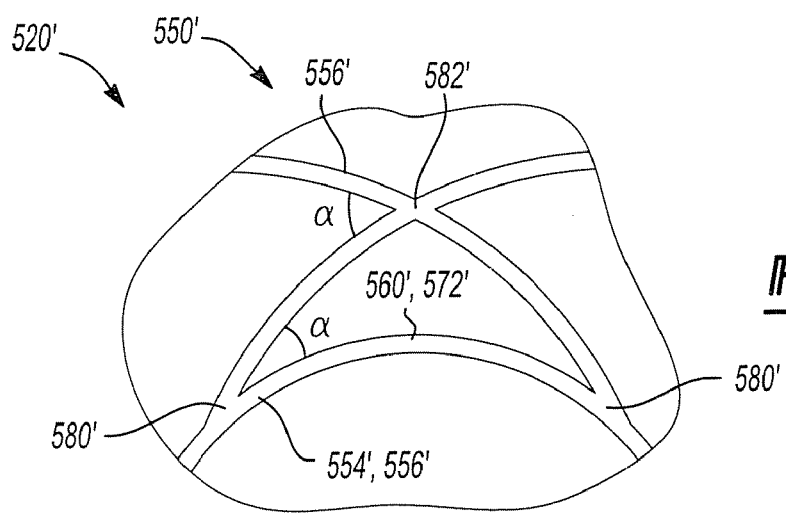
_Fig-8B_

BI-DIRECTIONAL PATTERN FOR DYNAMIC SEALS

FIELD OF THE INVENTION

The present invention relates to dynamic seals, and more particularly, to bi-directional pumping patterns for dynamic seals.

BACKGROUND AND SUMMARY OF THE INVENTION

Rotary shaft seals have been used in machinery, the automotive industry, as well as other industries. For example, such applications can include use on transmissions, pinions, gears, axles, etc. that require a symmetrical functioning dynamic seal (i.e., the seal must function effectively in both directions of shaft rotation). The seal has an air side and a lubricant side. The seal helps maintain the lubricant (e.g. oil) on the lubricant side. Lubricant may, however, leak from a lubricated side to the non-lubricated (air) side through the interaction of the active surface of the seal with the shaft. Spiral grooves or built-up ribs (hereinafter collectively referred to as grooves) disposed on the active side of the seal capture the leaked lubricant and hydrodynamically pump the lubricant back into the lubricated side due to relative rotation between the seal and the shaft about which the seal is disposed.

Typically, the grooves are arranged in a spiral or helical configuration on the shaft-contacting side of the seal. In order to enable hydrodynamic pumping of captured lubricant, the grooves spiral along the active surface of the seal in opposite directions to accommodate relative rotation between the shaft and the seal regardless of the direction of the relative rotation. The grooves are open at the lubricant side of the seal and communicate with the lubricant therein. Having the grooves open at the lubricant side of the seal creates potential problems. For example, static oil leaks can develop. Additionally, air leakage during pressurization testing of the machinery on which the seal is being used at the end of the assembly stage can also occur. Accordingly, it would be advantageous to provide a dynamic seal having a bi-directional pattern thereon to capture lubricant that leaks past the seal edge and returns the same to lubricant side of the seal. Furthermore, it would be advantageous if such a dynamic seal minimized and/or avoided the drawbacks mentioned above.

A dynamic seal according to the principles of the present invention advantageously provides for the return of captured lubricant to the lubricant side regardless of the direction of the relative rotation between the seal and the shaft. The seal uses symmetrical pumping elements to facilitate the hydrodynamic pumping of the captured lubricant in response to the relative rotation. The symmetrical pumping elements have ending points that stop short of the seal edge of the seal. The seal may utilize secondary pumping elements that communicate with the primary pumping elements to capture lubricant that is not captured by the primary pumping elements. The secondary stage pumping elements capture the excess lubricant and deliver and transfer the lubricant to the primary stage pumping elements for subsequent hydrodynamic pumping back into the lubricant side of the seal.

In one aspect of the present invention, a bi-directional dynamic seal includes a lubricant side and a non-lubricant side. There is a sealing portion having an active surface that communicates with the non-lubricant side and a seal lip at an end thereof. The seal lip faces the lubricant side. The seal lip defines an opening in which a shaft can be disposed. The active surface is operable to engage with and seal against a shaft disposed in the opening. A plurality of pumping elements extends along the active surface. The pumping elements stop short of the seal lip and there is a static dam therebetween. The pumping elements are operable to capture lubricant that leaks past the seal lip and pump the captured lubricant toward the seal lip, past the static dam and back into the lubricant side due to relative rotation between the active surface and the shaft disposed in the opening. The pumping occurs regardless of a direction of the relative rotation.

In another aspect of the present invention, a dynamic bi-directional seal includes an active surface operable to engage with and form a seal against a shaft. There is a seal lip that defines an opening which is operable to receive a shaft. A bi-directional fluid pumping pattern is located on the active surface and is operable to capture lubricant that leaks past the seal lip and pump captured lubricant to a lubricant side. The pumping pattern includes a plurality of primary pumping elements that extend along the active surface. Each primary pumping element has a pair of termination points adjacent the seal lip. Each primary pumping element also has an induction point remote from the seal lip. The pumping pattern also includes a plurality of secondary pumping elements extending along the active surface. The primary pumping elements are disposed between the secondary pumping elements and the seal lip. The secondary pumping elements are operable to capture lubricant that leaks past the primary pumping elements and direct captured lubricant to the induction points of the primary pumping elements.

In yet another aspect of the present invention, a method of returning lubricant that leaks past a seal edge of a seal on a shaft back to the lubricant side of the seal is disclosed. The method includes (1) capturing lubricant that leaks past the seal edge with a plurality of primary pumping elements on an active surface of the seal; (2) capturing lubricant that leaks past the primary pumping elements with a plurality of secondary pumping elements on the active surface of the seal, the primary pumping elements being disposed between the seal edge and the secondary pumping elements; (3) transferring lubricant captured in the secondary pumping elements to induction points of the primary pumping elements; and (4) pumping lubricant captured by and/or transferred to the primary pumping elements to the lubricant side of the seal with relative rotation between the active surface of the seal and the shaft regardless of a direction of the relative rotation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a schematic simplified representation of a top plan view of the active surface of the seal of FIG. 1 showing the fifth preferred embodiment of the bi-directional pattern on the active surface of the seal;

FIGS. 8A and B are schematic simplified representations of a portion of a top plan view of the active surface of the seal of FIG. 1 showing alternate arrangements for the connecting of the pumping elements in the primary and secondary stages and/or in the various sets of secondary stage pumping elements;

DETAILED DESCRIPTION OF THE PREFERRED EMBODIMENTS

The following description of the preferred embodiments is merely exemplary in nature and is in no way intended to limit the invention, its application, or uses. Reference indicia are used herein to point out or describe particular components, features or aspects of the present invention. When describing components, features or aspects of the various embodiments that are the same or similar to previously described components, features or aspects of a previous embodiment(s), the same reference indicia or the same reference indicia with the addition of a hundreds number to the original reference indicia is used. For example, the seal may be referred to as 20, 120, 220, 320, 420, 520 and 620 for the various embodiments disclosed herein.

Figure 1:
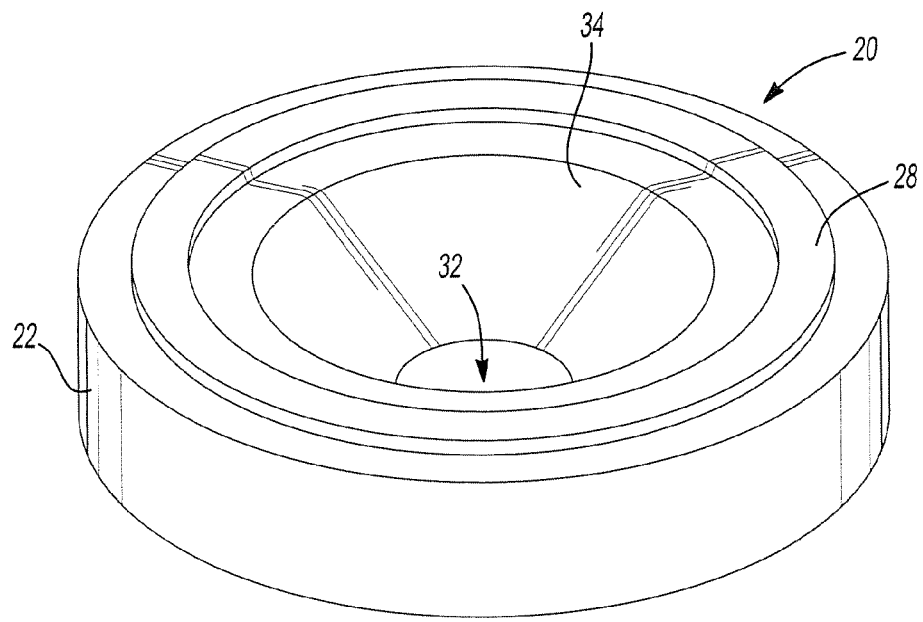
FIG. 1 is a simplified perspective view of the seal of the present invention.
Figure 2:
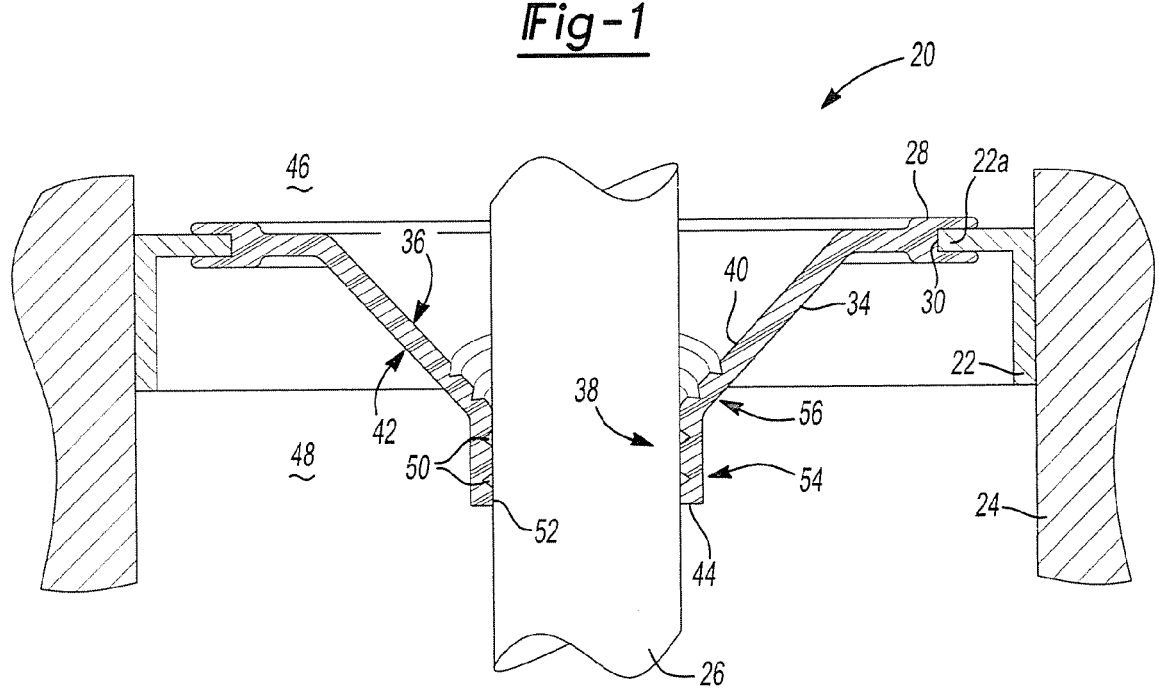
FIG. 2 is a cross-sectional view of the seal of FIG. 1 disposed around a shaft.

With reference to FIGS. 1 and 2, a dynamic bi-directional seal 20 according to the principles of the present invention is shown. Seal 20 is mounted to a casing 22 which is disposed in a fixed housing 24 in a manner which is well known in the art. Seal 20 engages a rotary shaft 26 and provides a sealed relationship between rotary shaft 26 and housing 24 in which casing 22 is disposed. With reference to FIG. 2, seal 20 includes a mounting portion 28 having an annular recess 30 therein. A mounting portion 22a of casing 22 resides within annular recess 30. It should be noted that mounting portion 28 and casing 22 can take on many shapes and forms and are not considered to be particularly relevant to the present invention. Mounting portion 28 is mounted to casing 22 which can be made of plastic or metal and mounting portion 28 can be bonded thereto according to well known mounting techniques.

Seal 20 includes a central opening 32 in which shaft 26 is disposed. The diameter of opening 32 is dimensioned to be less than the diameter of shaft 26 to provide a desired fit therebetween. That is, the portion of seal 20 proximate opening 32 will deform as seal 20 is positioned on shaft 26. The deformation of seal 20 is resisted and a seal is formed against shaft 26.

Seal 20 has a conically-shaped sealing portion 34 that extends axially and radially from mounting portion 28. Opening 32 is located in sealing portion 34. Sealing portion 34 has an active side/surface 36. Active surface 36 has an engaging portion 38 that engages with shaft 26 and a non-engaging portion 40. Sealing portion 34 also includes a non-active side/surface 42 that is opposite active surface 36. Non-active surface 42 does not engage with shaft 26. A leading seal edge or lip 44 separates active surface 36 and non-active surface 42. Active surface 36 is exposed to a non-lubricant or air side 46 of seal 20 while non-active surface 42 and seal edge 44 are exposed to a lubricant (e.g. oil) side 48 of seal 20.

Active surface 36 of seal 20 has a bi-directional pumping pattern that includes a plurality of pumping elements 50 that are disposed on engaging portion 38 and, in some embodiments, also on non-engaging portion 40. Pumping elements 50 are operable to capture lubricant that leaks past seal edge 44 and between shaft 26 and engaging portion 38 of active surface 36. Pumping elements 50 capture the leaked lubricant and hydrodynamically pump the lubricant back toward and into lubricant side 48 as a result of relative rotation between seal 20 and shaft 26, as described below. A static dam 52 is disposed between seal edge 44 and pumping elements 50 and seals against shaft 26. Static dam 52 separates the engineered region (region containing the pumping pattern) of active surface 36 from seal edge 44. Pumping elements 50 can be a plurality of grooves that are coined, cut into or otherwise formed along active surface 36. Alternatively, pumping elements 50 can be raised ribs that form channels therebetween to capture the leaked lubricant and hydrodynamically pump the same toward and into lubricant side 48 due to relative rotation between seal 20 and shaft 26. The ribs can be formed, molded or produced by other means along active surface 36. Thus, it should be appreciated that the term pumping elements can refer to either grooves, ribs or both along active surface 36 of seal 20.

Figure 3:
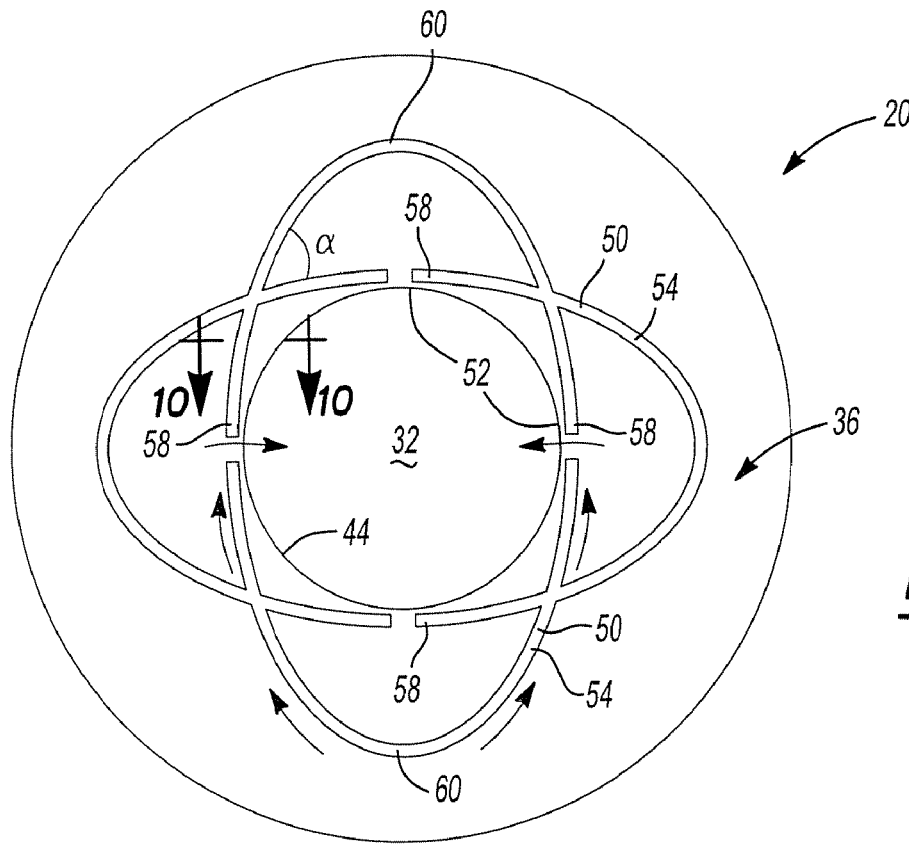
FIG. 3 is a schematic simplified representation of a top plan view of the active surface of the seal of FIG. 1 showing the first preferred embodiment of the bi-directional pattern on the active surface of the seal.

Pumping elements 50 are arranged on active surface 36 to provide a desired pattern that results in capturing the leaked lubricant and directing the same toward and into lubricant side 48. Pumping elements 50 are arranged so that a bi-directional pattern is formed and the pumping elements 50 are operable regardless of the direction in which the relative rotation between shaft 26 and seal 20 occurs. To accomplish this, pumping elements 50 are arranged in a substantially symmetrical orientation on active surface 36, as described below. Pumping elements 50 are staged in relation to a distance from seal edge 44. There can be one or more stages. The stage closest to seal edge 44 is called the primary stage 54 while the pumping elements 50 that are more remote from seal edge 44 are called secondary stages 56. For example, as shown in FIG. 3, the seal can include four primary stage pumping elements 54 and no secondary stage pumping elements. While the seal in FIG. 4 includes both primary stage pumping elements (the same as in FIG. 3) and a plurality of secondary stage pumping elements, as described below. The function of the primary stage pumping elements is to capture a leaked lubricant and direct the same toward and into lubricant side 48 of the seal. The function of the secondary stage pumping elements is to capture lubricant that leaks past the primary stage pumping elements and transport the captured lubricant back to the primary stage pumping elements for subsequent pumping and delivery back into lubricant side 48, as described below.

Preferably, each stage consists of identical pumping elements positioned in a symmetrical fashion along active surface 36 about central opening 32. There can be as few as two mutually-intersecting primary stage pumping elements 54 in the primary stage, such that each pumping element 50 embraces less than one full circle around central opening 32, and as many as needed. One of the factors to consider in the number of pumping elements within the primary stage is the seal height to shaft diameter relationship. The use of a secondary stage is optional, as described below. When a secondary stage is used, the number of secondary stage pumping elements 56 therein has no upper limit and can be as few as one.

Preferably, the primary stage pumping elements 54 are mostly within engaging portion 38 of active surface 36 (i.e., mostly in the area of direct contact between active surface 36 and shaft 26), but can also be in non-engaging portion 40. The secondary stage pumping elements 56 are preferably mostly within non-engaging portion 40 (i.e., mostly in the area of the gap between active surface 36 and shaft 26), but can also be in engaging portion 38.

Preferably, each primary stage pumping element 54 has a variable height (in the case of ribs) or a variable cross-sectional area (in the case of grooves) which reduces to zero as each pumping element approaches its termination points 58 adjacent static dam 52. The purpose of this variation is to cause a favorable increase in fluid pressure within the primary stage pumping elements 54 close to termination points 58. The maximum pressure reached at termination points 58 depends on the length of the pumping elements (length of the groove or volume of the wedge-like shape formed by the ribs) filled with the fluid. When the pressure exceeds the seal edge opening pressure, seal edge 44 and static dam 52 of engaging portion 38 of active surface 36 lifts off shaft 26 and the lubricant being pumped by primary stage pumping elements 54 is directed back into lubricant side 48. The dynamics of this cycle of pumping captured lubricant back into lubricant side 48 depends on numerous factors including the rate at which leaked lubricant is generated, the groove/rib geometry, seal edge opening pressure, material memory properties, etc. Two basic regimes can be envisioned—a steady state regime and a dynamic regime. A steady state regime forms when the leakage rate and the pump rate are statically balanced. The area of active surface 36 (static dam 52 and seal edge 44) most close to termination points 58 is then continuously open just enough to produce flow resistance sufficient to maintain permanent fluid residence in the groove/wedge formed by primary stage pumping elements 54. In the dynamic regime, seal edge 44 and static dam 52 adjacent termination points 58 experience periodic liftoffs from shaft 26 emptying the groove/wedge reservoir and returning the captured lubricant to lubricant side 48. A benefit of such a construction is that as long as the lubricant is present in the groove/wedge regions of primary stage pumping elements 54, lubrication is provided to seal edge 44 and static dam 52.

Referring now to FIG. 3, a first preferred embodiment of a bi-directional pattern of pumping elements on active surface 36 of seal 20 is shown. In the first preferred embodiment, all of the pumping elements are primary stage pumping elements 54. Preferably, each primary stage pumping element 54 is identical to one another and symmetrically positioned on active surface 36. Each primary stage pumping element 54 has two termination points 58 that are adjacent seal edge 44 with static dam 52 therebetween. In the first preferred embodiment, there are four identical arcuate primary stage pumping elements 54 each having two termination points 58 symmetrically positioned about a single induction point 60.

Induction point 60 is the portion of the pumping element most remote from seal edge 44. The distance (in radial direction on FIGS. 3-7) between induction point 60 and termination points 58 defines the pitch of the pumping element. In primary stage pumping elements 54, the smaller the pitch—the higher the fluid pressure at the termination points 58, but the lower the axial fluid thrust. Inversely, the higher the pitch—the smaller the fluid pressure at the termination point 58 and the higher the axial fluid thrust. Thus, the pitch is selected based on interplay between the seal edge design 44, the material properties, and the pump rate that is needed. Primary stage pumping elements 54 are arranged on active surface 36 such that each pumping element embraces less than one full circle around seal edge 44. Preferably, primary stage pumping elements 54 are arranged such that lubricant escaping past seal edge 44 must encounter one or more primary stage pumping elements 54 before extending beyond engaging portion 38 of active surface 36. Primary stage pumping elements 54 have mutual intersections with one another as they extend between termination points 58. The captured lubricant within primary stage pumping elements 54 is pumped toward one of the termination points 58, based upon the direction of relative rotation between shaft 26 and seal 20. To facilitate smooth fluid flow to the termination point through the mutual intersection with other primary stage pumping elements 54, it is preferred that the intersection angle $\alpha$ between the pumping elements is an acute angle noticeably greater than zero degrees. When the captured lubricant reaches one of the termination points 58, the fluid pressure therein increases to a level exceeding that of the seal liftoff pressure (the pressure which seal edge 44 and static dam 52 lift off from shaft 26) and flow past static dam 52 and seal edge 44 into lubricant side 48.

Figure 4:
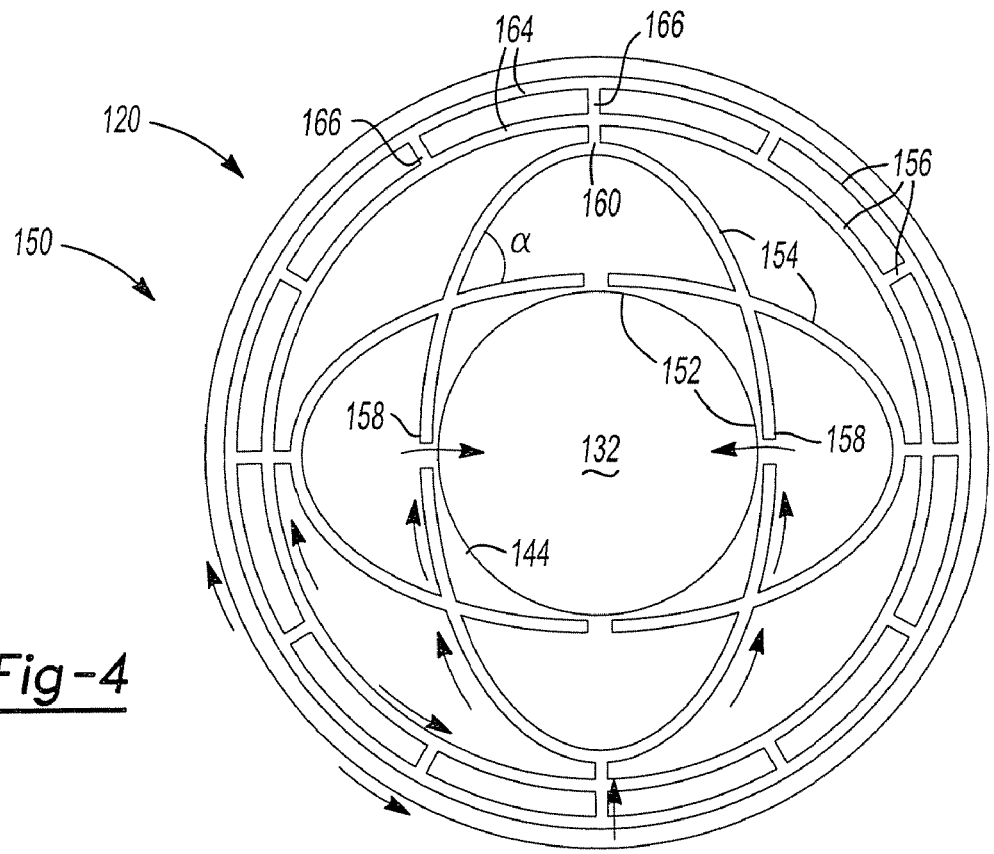
FIG. 4 is a schematic simplified representation of a top plan view of the active surface of the seal of FIG. 1 showing the second preferred embodiment of a bi-directional pattern on the active surface of the seal.

Referring now to FIG. 4, a bi-directional pattern of pumping elements 150 for seal 120 according to a second preferred embodiment of the present invention is shown. In the second preferred embodiment, secondary stage pumping elements 156 are utilized in addition to primary stage pumping elements 154. The secondary stage pumping elements 156 function to catch lubricant that leaks past the primary stage pumping elements 154 and transport that captured lubricant back into the primary stage pumping elements 154 for further pumping back to lubricant side 48. Secondary stage pumping elements 156 direct the captured lubricant therein to the induction points 160 of the primary stage pumping elements 154. Because induction points 160 are the most remote portion of the primary stage pumping elements 154 between termination points 158, this is a transition wherein relative rotation will cause the lubricant therein to flow toward one of the termination points 158 depending upon the direction of relative rotation. The number of secondary stage pumping elements 156 can vary from zero, such as in the first preferred embodiment, to multiple secondary stage pumping elements 156, as shown in FIG. 4. There is no upper limit to the number of secondary stage pumping elements 156 that can be employed.

Secondary stage pumping elements 156 extend primarily along non-engaging portion 40 of active surface 36 although some portion of secondary stage pumping elements 156 can extend along engaging portion 38 of active surface 36. The height (in the case of ribs) and the cross-sectional area (in the case of grooves) do not need to be changing, as in the preferred embodiments of the primary stage pumping elements. Rather, secondary stage pumping elements 156 can have a generally uniform height or cross-sectional area. It should be appreciated, however, that the height (in the case of ribs) and the cross-sectional area (in the case of grooves) may be configured to be changing to provide a favorable fluid pressure gradient within secondary stage pumping elements 156, if desired. The majority of the pumping force created by secondary stage pumping elements 156 is energized by air movement in the non-lubricated side 46 due to relative rotation between the shaft and the seal. It is anticipated that the pumping rate produced by secondary stage pumping elements 156 will be less than the pumping rate produced by the primary stage pumping elements. This is acceptable as the secondary stage pumping elements are expected to receive/capture lubricant at a slower rate than the primary stage pumping elements.

In the second preferred embodiment, secondary stage pumping elements 156 include two concentric radially-extending pumping elements 164 that are interconnected by a plurality of axially-extending pumping elements 166. Some of the axially-extending pumping elements 166 also communicate with induction points 160 on the primary stage pumping elements 154. Secondary stage pumping elements 156 thereby communicate with the induction points 160 of primary stage pumping elements 154 to route lubricant captured therein back to primary stage pumping elements 154.

Figure 5:
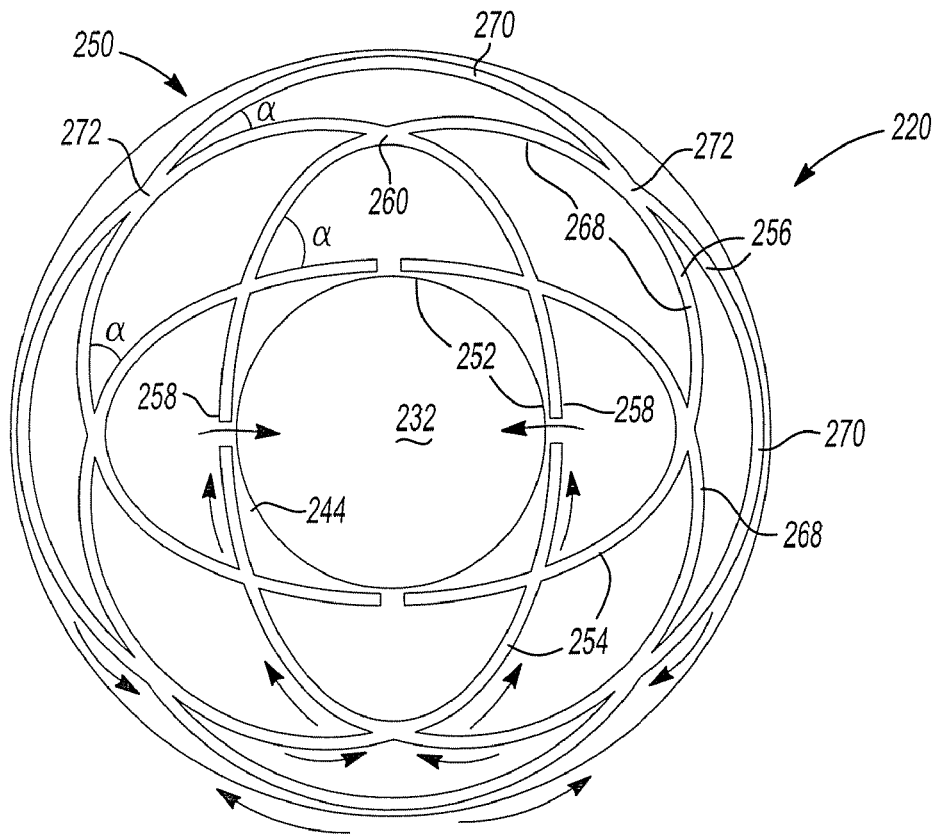
FIG. 5 is a schematic simplified representation of a top plan view of the active surface of the seal of FIG. 1 showing the third preferred embodiment of the bi-directional pattern on the active surface of the seal.

Referring now to FIG. 5, a bi-directional pattern for pumping elements 250 for seal 220 according to a third preferred embodiment of the present invention is shown. In the third preferred embodiment, the same primary stage pumping elements 250 as discussed above with reference to the first and second preferred embodiments are utilized. The secondary stage pumping elements 256, however, are different. Specifically, the secondary stage pumping elements 256 are arcuate and include two distinct sets of secondary stage pumping elements 256. A first set 268 of secondary stage pumping elements extends between and communicates with adjacent induction points 260 in adjacent primary stage pumping elements 254. A second set 270 of secondary stage pumping elements extend between adjacent induction points 272 of adjacent pumping elements in first set 268.

The arcuate shape of secondary stage pumping elements 256 causes lubricant therein to flow from second set 270 of secondary stage pumping elements to induction points 272 on first set 268 of secondary stage pumping elements. Lubricant within first set 268 of secondary stage pumping elements flows to the induction points 260 of primary stage pumping elements 254 which then subsequently flows to termination points 258. To facilitate the smooth transfer of lubricant within secondary stage pumping elements 256, it is preferred that the intersection angle α between first and second sets 268, 270 of secondary stage pumping elements and between first set 268 of pumping elements and primary stage pumping elements 254 be an acute angle noticeably greater than zero degrees. It should be appreciated that the intersection angle between first and second sets 268, 270 of secondary stage pumping elements can be different than the intersection angle between first set 268 of secondary stage pumping elements and primary stage pumping elements 254.

In the third preferred embodiment, the number of primary stage pumping elements 254 determines the number of pumping elements in first and second sets 268, 270 of secondary stage pumping elements. That is, because first set 268 of secondary stage pumping elements extend between adjacent induction points 260 of adjacent primary stage pumping elements 254, the same number of pumping elements are required in first set 268 as there are number of primary stage pumping elements 254. Likewise, with second set 270 of secondary stage pumping elements extending between induction points 272 on adjacent pumping elements in first set 268, the number of pumping elements in second set 270 is the same as the number of pumping elements in first set 268.

Figure 6:
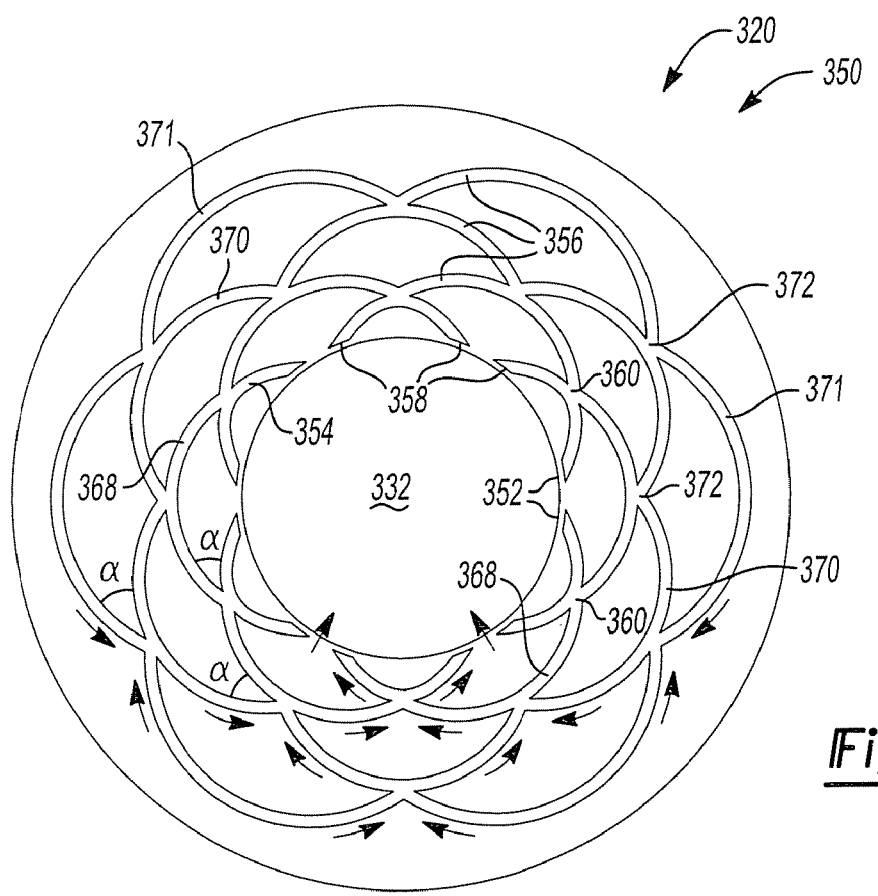
FIG. 6 is a schematic simplified representation of a top plan view of the active surface of the seal of FIG. 1 showing the fourth preferred embodiment of the bi-directional pattern on the active surface of the seal.

Referring now to FIG. 6, a bi-directional pattern for pumping elements 350 for seal 320 according to a fourth preferred embodiment of the present invention is shown. In the fourth preferred embodiment, six primary stage pumping elements 354 are utilized with each primary stage pumping element 354 extending along a smaller portion of active surface 336 of seal 320 than in the previous embodiments. Additionally, primary stage pumping elements 354 do not intersect with one another. In other regards, primary stage pumping elements 354 are substantially the same as the primary stage pumping elements discussed above with reference to the first, second and third preferred embodiments. The secondary stage pumping elements 356 are arcuate and include three distinct sets of secondary stage pumping elements 356. A first set 368 of secondary stage pumping elements extends between and communicates with adjacent induction points 360 in adjacent primary stage pumping elements 354. A second set 370 of secondary stage pumping elements extends between adjacent induction points 372 of adjacent pumping elements in first set 368. A third set 371 of secondary stage pumping elements extends between adjacent induction points 372 of adjacent pumping elements in second set 370.

The arcuate shape of secondary stage pumping elements 356 causes lubricant therein to flow from third set 371 of secondary stage pumping elements to induction points 372 on second set 370 of secondary stage pumping elements. Lubricant within second set 370 of secondary stage pumping elements flows to induction points 372 on first set 368 of secondary stage pumping elements. Lubricant within first set 368 of secondary stage pumping elements flows to induction points 360 of primary stage pumping elements 354 which then subsequently flows to termination points 358. To facilitate the smooth transfer of lubricant within secondary stage pumping elements 356, it is preferred that the intersection angle α between first, second and third sets 368, 370, 371 of secondary stage pumping elements and between first set 368 of pumping elements and primary stage pumping elements 354 be an acute angle noticeably greater than zero degrees. It should be appreciated that the intersection angle between first, second and third sets 368, 370, 371 of secondary stage pumping elements can each be different and can also be different than the intersection angle between first set 368 of secondary stage pumping elements and primary stage pumping elements 354.

In the fourth preferred embodiment, the number of primary stage pumping elements 354 again determines the number of pumping elements in first, second and third sets 368, 370, 371 of secondary stage pumping elements. That is, because each set of secondary stage pumping elements extends between adjacent induction points of adjacent primary stage pumping elements 354 or adjacent secondary stage pumping elements 356, the same number of pumping elements are required in each set of secondary stage pumping elements 356 as there are number of primary stage pumping elements 354.

Referring now to FIG. 7, a bi-directional pumping pattern of pumping elements 450 for seal 420 according to a fifth preferred embodiment of the present invention is shown. The fifth preferred embodiment is similar to the third preferred embodiment with the difference being that the second set 470 of secondary stage pumping elements has open ends 474 and lack an induction point. First and second sets 468, 470 are still arcuate and symmetrical in nature and, thus, drive lubricant therein toward primary stage pumping elements 454 as a result of relative rotation between the shaft and the seal. Just like in the third preferred embodiment, the fluid within second set 470 of secondary stage pumping elements will be directed toward induction points 472 of first set 468 of secondary stage pumping elements. Fluid within first set 468 of secondary stage pumping elements will be driven toward induction points 460 of primary stage pumping elements 454 and then on to termination points 458 and into the lubricant side of seal 420. The open ends 474 of second set 470 of secondary stage pumping elements may allow some lubricant therein to escape. Thus, in the fifth preferred embodiment, all of the advantages of the second, third and fourth preferred embodiments may not be realized.

Referring now to FIGS. 8A and 8B, alternate arrangements for the interconnection of secondary stage pumping elements 556 with other secondary stage pumping elements 556 and/or primary stage pumping elements 554 is shown. In the preceding preferred embodiments, the intersection of pumping elements resulted in a termination point of one pumping element corresponding to an induction point of the pumping element into which the captured lubricant is directed. In the embodiment shown in FIG. 8A the secondary stage pumping elements 556 are shown as having termination points 580 that interconnect with a primary stage pumping element 554 and/or a closer in secondary stage pumping element 556 at locations other than the respective induction points 560, 572. In these alternate embodiments, lubricant within the secondary stage pumping elements 556 are transferred to primary stage pumping elements 554 or other closer in secondary stage pumping elements 556 for subsequent transfer to primary stage pumping elements 554. Again, to facilitate the smooth transfer of lubricant between the various pumping elements, it is preferred that the intersection angle α be an acute angle noticeably greater than zero degrees.

Referring now to FIG. 8B, a second alternate configuration for the interconnection of secondary stage pumping elements 556' with other secondary stage pumping elements 556' or primary stage pumping elements 554' is shown. In this alternate arrangement, the secondary stage pumping elements 556' again have termination points 580' that interconnect with either primary stage pumping elements 554' or closer in secondary stage pumping elements 556' at locations other than their respective induction points 560', 572'. Additionally, the secondary stage pumping elements 556' intersect one another at an intersection point 582' prior to termination points 580'. Lubricant captured within secondary stage pumping elements 556' is transferred to primary stage pumping elements 554', or other closer in secondary stage pumping elements 556' for subsequent transfer to primary stage pumping elements 554'. To facilitate the smooth transfer of lubricant between the pumping elements 550', it is preferred that the intersection angle α be an acute angle noticeably greater than zero degrees. It should be appreciated that the alternate configurations shown in FIGS. 8A and 8B for pumping elements 550, 550' can be utilized in whole or in part with the various preferred embodiments.

Figure 9:
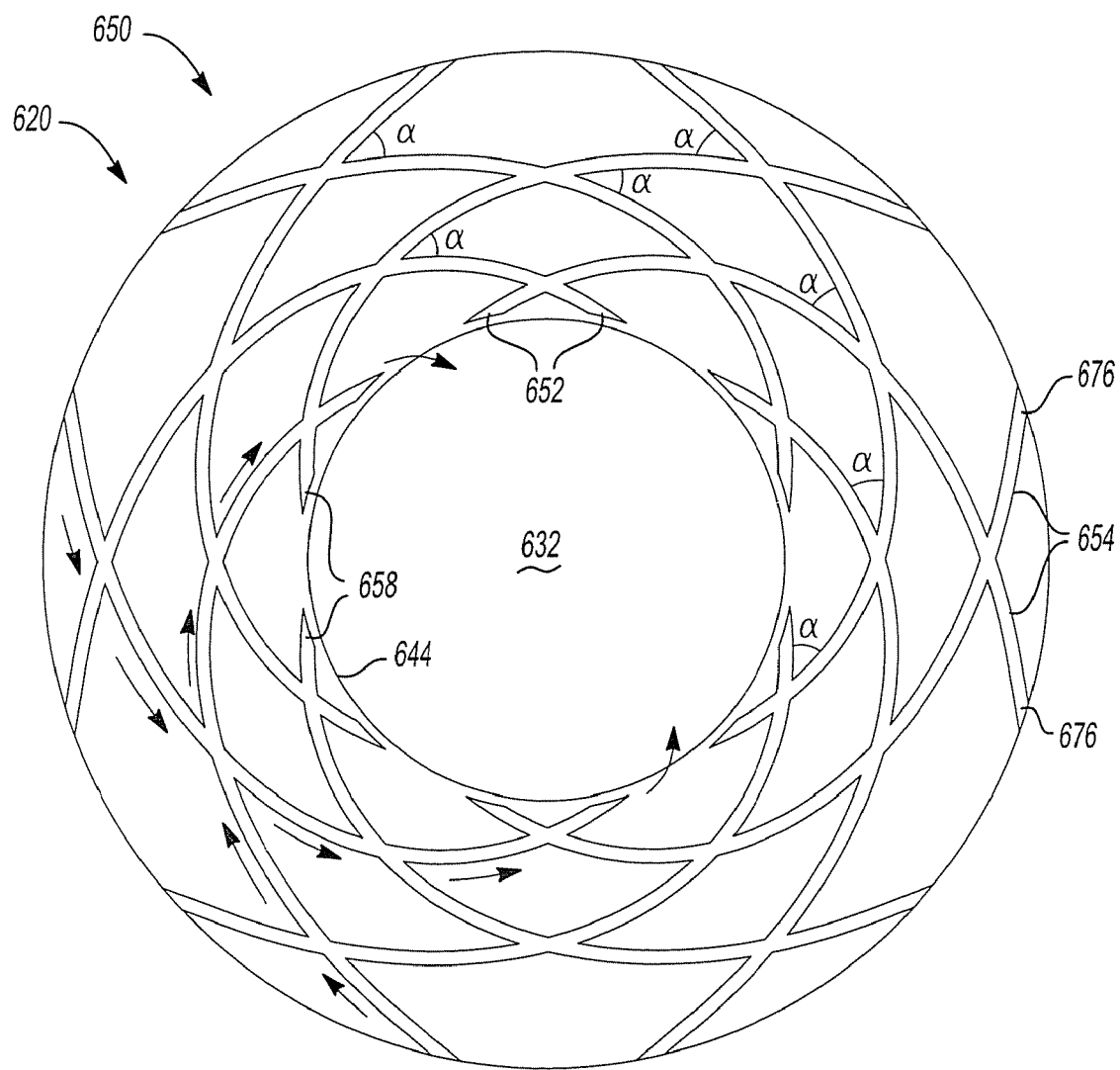
FIG. 9 is a schematic simplified representation of a top plan view of the active surface of the seal of FIG. 1 showing the sixth preferred embodiment of the bi-directional pattern on the active surface of the seal.
Figure 10:
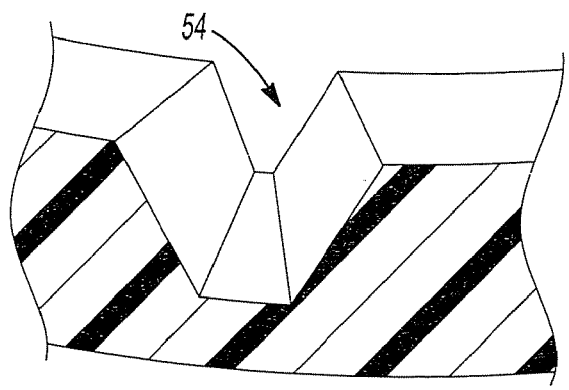
FIG. 10 is a fragmented cross-sectional view along line 10-10 of FIG. 3.

Referring now to FIG. 9, a bi-directional pattern of pumping elements 650 for seal 620 according to a sixth preferred embodiment of the present invention is shown. In the sixth preferred embodiment, only primary stage pumping elements 654 are utilized. The primary stage pumping elements 654 include a plurality of helically or spirally-extending pumping elements that extend from termination points 658 adjacent static dam 652 and seal edge 644 to open ends 676. Primary stage pumping elements 654 can extend less than or more than an entire circumference of central opening 632 when extending from termination points 658 to open ends 676. One half of the primary stage pumping elements 654 extend clockwise while the other half of primary stage pumping elements 654 extend counter clockwise around central opening 632 to thereby provide bi-directional pumping of lubricant therein. The angle α at which primary stage pumping elements 654 intersect one another is preferably an acute angle noticeably greater than zero degrees to facilitate the fluid transfer straight through the intersection. Preferably, the height (in the case of ribs) or cross-sectional area (in the case of grooves) decreases to zero as the primary stage pumping elements 654 approach termination points 658. This results in an increasing fluid pressure as the lubricant approaches termination points 658 and facilitates the liftoff of static dam 652 and seal edge 644 and the return of lubricant to lubricant side 648 of seal 620. Again, the use of open ends 676 may result in some lubricant escaping. Thus, all of the benefits of some of the other preferred embodiments may not be realized in the fifth preferred embodiment.

The seal according to the principles of the present invention can be made from a variety of material compositions. For example, the dynamic seal can include plastic, rubber or any of a wide variety of known elastomers, such as PTFE, TPE (thermoplastic elastomers), TPV (thermoplastic vulcanizers), and Flouroprene™ material, a composition described in U.S. Pat. No. 6,806,306, among others.

Thus, a seal utilizing one of the bi-directional patterns for its pumping elements advantageously captures lubricant that leaks past the seal edge and returns the lubricant to the lubricant side of the seal. The use of symmetrical pumping elements provides a substantially equal pumping capability regardless of the direction of relative rotation between the seal and the shaft. Additionally, the use of a static dam allows for lubrication of the contacting portion of the static dam with each discharge of lubricant back into the lubricant side of the seal. The use of secondary stage pumping elements advantageously provides additional capabilities in the event that lubricant leaks past the first stage of pumping elements.

While the present invention has been described and illustrated with reference to specific embodiments, it should be appreciated that these embodiments are merely exemplary in nature and that variations that depart from the embodiments shown are intended to be within the scope of the present invention. For example, the arcuate shapes of the various pumping elements can be different than that shown. Moreover, the arcuate shape can change as the pumping elements extend along the active surface such that a constant arcuate shape is not required. Furthermore, the pumping elements can extend more or less around the central opening than shown. Additionally, the number of pumping elements that form each stage can differ from that shown. Thus, variations that do not depart from the gist of the invention are intended to be within the scope of the invention. Such variations are not to be regarded as a departure from the spirit and scope of the invention.

What is claimed is:

1. A bi-directional dynamic seal comprising:
 a lubricant side;
 a non-lubricant side;
 a sealing portion having an active surface communicating with said non-lubricant side and a leading seal edge at an end thereof, said leading seal edge facing said lubricant side, said leading seal edge defining an opening in which a shaft can be disposed, and said active surface operable to engage with and seal against a shaft disposed in said opening; and
 a plurality of pumping elements extending along said active surface and stopping short of said leading seal edge with a static dam therebetween, said pumping elements operable to capture lubricant that leaks past said leading seal edge and pump said captured lubricant toward said leading seal edge, past said static dam and back into said lubricant side due to relative rotation between said active surface and a shaft disposed in said opening regardless of a direction of said relative rotation, wherein said pumping elements are primary pumping elements each having two distal ends with termination points adjacent said static dam and an induction point at a location along said pumping elements most remote from said leading seal edge, and further comprising a plurality of secondary pumping elements extending along said active surface with said primary pumping elements disposed between said secondary pumping elements and said leading seal edge, said secondary pumping elements operable to capture lubricant that leaks past said primary pumping elements and direct said captured lubricant to said induction points of said primary pumping elements, and at least one of said secondary pumping elements intersects at least one of said primary pumping elements at an induction point.

2. The seal of claim 1, wherein at least two of said pumping elements intersect with one another.

3. The seal of claim 2, wherein intersecting pumping elements have an intersection angle noticeably greater than zero.

4. The seal of claim 1, wherein said pumping elements are symmetrical.

5. The seal of claim 1, wherein pumping elements terminating adjacent said static dam have a cross-sectional area that diminishes as said pumping elements approach said static dam.

6. The seal of claim 1, wherein said pumping elements are grooves.

7. The seal of claim 1, wherein at least one of said secondary pumping elements intersects two different primary pumping elements at induction points of said two different primary pumping elements.

8. A dynamic bi-directional seal comprising:
an active surface for engaging with and forming a seal against a shaft;
a leading seal edge defining an opening for said shaft;
a bi-directional fluid pumping pattern on said active surface for capturing lubricant that leaks past said seal lip and for pumping captured lubricant to a lubricant side, said pumping pattern including:
  (i) a plurality of primary pumping elements extending along said active surface for pumping captured lubricant to said lubricant side, each primary pumping element having two distal ends with termination points adjacent said leading seal edge, and each primary pumping element having an induction point remote from said leading seal edge; and
  (ii) a plurality of secondary pumping elements extending along said active surface with said primary pumping elements between said secondary pumping elements and said leading seal edge, said secondary pumping elements for capturing lubricant that leaks past said primary pumping elements and for directing captured lubricant to said primary pumping elements,
wherein said primary and secondary pumping elements are grooves, said primary pumping elements define primary flow paths, said secondary pumping elements define secondary flow paths, at least one of said secondary pumping elements intersects at least one of said primary pumping elements at an induction point, and said primary and secondary flow paths are non-aligned with one another such that captured lubricant flowing along one of said secondary flow paths into one of said primary flow paths through an associated induction point experiences a change in direction while continuing to flow around said opening in a same clockwise or counter-clockwise orientation.

9. The seal of claim 8, wherein distal ends of each pumping element in a first set of secondary pumping elements extend between induction points of two of said primary pumping elements and direct captured lubricant to said induction points of said primary pumping elements.

10. The seal of claim 9, wherein each pumping element in a second set of secondary pumping elements has distal ends that intersect with an induction point of one of said secondary pumping elements in said first set.

11. The seal of claim 10, wherein each pumping element in said second set of secondary pumping elements has distal ends that intersect with adjacent induction points of two adjacent secondary pumping elements in said first set.

12. The seal of claim 10, wherein one end of each pumping element in said second set of secondary pumping elements communicates with an induction point of one of said secondary pumping elements in said first set and a second end of each pumping element in said second set is open.

13. The seal of claim 8, wherein each of said primary pumping elements is arcuate and symmetrical.

14. The seal of claim 13, wherein each of said primary pumping elements is symmetrical about its induction point.

15. The seal of claim 8, wherein at least one secondary pumping element intersects at least one other secondary pumping element.

16. The seal of claim 8, wherein each of said primary pumping elements stops short of said leading seal edge and a static dam is disposed between each termination point and said leading seal edge.

17. The seal of claim 8, wherein each of said primary pumping elements intersects at least two other primary pumping elements.

18. The seal of claim 8, wherein said secondary pumping elements include at least one annular pumping element that encircles said primary pumping elements and a plurality of substantially straight pumping elements extending between and communicating with said annular pumping element and with said induction points.

19. The seal of claim 8, wherein a majority of each primary pumping element extends along a portion of said active surface and contacts said shaft and a majority of each secondary pumping element extends along a portion of said active surface that is spaced apart from said shaft.

20. The seal of claim 8, wherein said primary pumping elements have a cross-sectional area that diminishes between said induction point and said termination points, and said secondary pumping elements have a substantially uniform cross-sectional area.

21. The seal of claim 8, wherein at least one of said secondary pumping elements intersects two different primary pumping elements at induction points of sad two different primary pumping elements.

22. A dynamic bi-directional seal comprising:
an active surface operable to engage with and form a seal against a shaft;
a leading seal edge defining an opening operable to receive a shaft;
a bi-directional fluid pumping pattern on said active surface operable to capture lubricant that leaks past said leading seal edge and pump captured lubricant to a lubricant side, said pumping pattern including:

(i) a plurality of primary pumping elements extending along said active surface and operable to pump captured lubricant to said lubricant side, each primary pumping element having distal ends with termination points adjacent said seal-lip leading seal edge, and each primary pumping element having an induction point remote from said leading seal edge; and (ii) a plurality of secondary pumping elements extending along said active surface with said primary pumping elements between said secondary pumping elements and said leading seal edge, said secondary pumping elements operable to capture lubricant that leaks past said primary pumping elements and direct captured lubricant to said primary pumping elements, wherein at least one of said plurality of primary and plurality of secondary pumping elements are non-circular, and at least one of said secondary pumping elements intersects at least one of said primary pumping elements at an induction point.

23. The seal of claim 22, wherein said plurality of primary pumping elements and said plurality of secondary pumping elements are arcuate.

24. The seal of claim 22, wherein said plurality of primary pumping elements are non-circular.

25. The seal of claim 22, wherein said plurality of primary pumping elements are ovoid.

26. The seal of claim 22, wherein both of said plurality of primary and plurality of secondary pumping elements are non-circular.

27. The seal of claim 22, wherein each of said primary pumping elements extend away from said seal lip and then toward said seal lip as said primary pumping elements extend between said pair of termination points.

28. The seal of claim 22, wherein at least one of said secondary pumping elements intersects two different primary pumping elements at induction points of said two different primary pumping elements.

* * * * *

UNITED STATES PATENT AND TRADEMARK OFFICE
CERTIFICATE OF CORRECTION

PATENT NO. : 7,494,130 B2  
APPLICATION NO. : 11/352627  
DATED : February 24, 2009  
INVENTOR(S) : Alexander Berdichevsky Page 1 of 1

It is certified that error appears in the above-identified patent and that said Letters Patent is hereby corrected as shown below:

Col. 13, claim 22, line 5, delete "seal-lip."

Signed and Sealed this

Sixteenth Day of June, 2009

JOHN DOLL  
*Acting Director of the United States Patent and Trademark Office*